US012791788B2

(12) United States Patent

Bian et al.

(10) Patent No.: US 12,791,788 B2

(45) Date of Patent: Nov. 10, 2026

(54) EDGE COUPLERS WITH MULTIPLE STAGES

(71) Applicant: GlobalFoundries U.S. Inc., Malta, NY (US)

(72) Inventors: Yusheng Bian, Ballston Lake, NY (US); Takako Hirokawa, Ballston Lake, NY (US); Zahidur Chowdhury, New Windsor, NY (US); Arpan Dasgupta, Beacon, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 276 days.

(21) Appl. No.: 18/733,272

(22) Filed: Jun. 4, 2024

(65) Prior Publication Data

US 2025/0370185 A1 Dec. 4, 2025

(51) Int. Cl.

*G02B 6/122* (2006.01)
*G02B 1/00* (2006.01)

(52) U.S. Cl.

CPC ........... *G02B 6/1228* (2013.01); *G02B 1/002* (2013.01)

(58) Field of Classification Search

CPC .................................................... G02B 6/1228
See application file for complete search history.

(56) References Cited

U.S. PATENT DOCUMENTS 10,802,214 B2 * 10/2020 Mahgerefteh ........ G02B 6/1228
11,215,756 B2 1/2022 Bian et al.
11,256,030 B1 2/2022 Chandran et al.
12,038,615 B2 7/2024 Bian
2016/0341896 A1 11/2016 Horth et al.
2020/0110219 A1 4/2020 Abbaslou et al.
2022/0146748 A1 5/2022 Bian
2023/0305241 A1 9/2023 Bian
2023/0314730 A1 10/2023 Bian

FOREIGN PATENT DOCUMENTS

TW 202343050 A 11/2023

OTHER PUBLICATIONS

European Patent Office; Extended European Search Report and Opinion issued in European Patent Application No. 24209696.4 on Apr. 30, 2025; 7 pages.

B. Bhandari et al., "Compact and Broadband Edge Coupler Based on Multi-Stage Silicon Nitride Tapers," in IEEE Photonics Journal, vol. 12, No. 6, pp. 1-11, Dec. 2020, Art No. 6602511, doi: 10.1109/JPHOT.2020.3036498.

(Continued)

*Primary Examiner* — Lisa M Caputo

(74) *Attorney, Agent, or Firm* — Thompson Hine LLP; Anthony Canale

(57) ABSTRACT

Structures for an edge coupler and methods of forming such structures. The structure comprises a waveguide core including a facet, a first tapered section, a second tapered section, and a longitudinal axis. The first tapered section is positioned along the longitudinal axis between the second tapered section and the facet. The first tapered section has a first width dimension that varies non-linearly with position along the longitudinal axis. The second tapered section has a second width dimension that varies non-linearly with position along the longitudinal axis.

20 Claims, 9 Drawing Sheets

(56) References Cited

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.
Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.
B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.
Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.
M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.
Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.
Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.
Y. Bian et al., "Monolithically integrated self-aligned SiN edge coupler with <0.6/0.8 dB TE/TM insertion loss, <−39 dB back reflection and >520 mW high-power handling capability," in Optical Fiber Communication Conference (OFC) 2023, Technical Digest Series (Optica Publishing Group, 2023), paper M3C.3.
Y. Bian et al., "Polarization mode dispersion in CMOS-integrated monolithic SiPh components: simulations and experiments," 2023 Optical Fiber Communications Conference and Exhibition (OFC), San Diego, CA, USA, 2023, pp. 1-3, doi: 10.1364/OFC.2023.Th2A.24.
Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.
Y. Bian et al., "Towards polarization insensitive photonic integrated circuits: polarization dependent loss reduction of CMOSintegrated monolithic SiPh components." OFC, Optica Publishing Group 2024; pp. 1-3; M1J.4.
Won Suk Lee et al., "Low-loss and broadband adiabatic polarization splitter rotator on a CMOS-integrated silicon photonics platform." OFC, Optica Publishing Group 2024; pp. 1-3; M1J.5.
Y. Bian et al., "Mitigating substrate leakage loss on a monolithic SiPh platform: experimental demonstration of hybrid Si—SiN waveguides for O-band datacom." OFC 2024, Optica Publishing Group 2024; pp. 1-3; Th3H.3.
Sujith Chandran et al., "High Performance Silicon Nitride Passive Optical Components on Monolithic Silicon Photonics Platform." OFC 2024, Optica Publishing Group 2024; pp. 1-3; Th3H.4.
Taiwan Intellectual Property Office; Examination Report issued in Taiwanese Patent Application No. 114117900 on May 8, 2026; 20 pages.
Ministry of Intellectual Property; Notice of Preliminary Rejection issued in Korean Patent Application No. 10-2025-0060139 on Aug. 13, 2026; 16 pages.

* cited by examiner

EDGE COUPLERS WITH MULTIPLE STAGES

BACKGROUND

The disclosure relates to photonic chips and, more specifically, to structures for an edge coupler and methods of forming such structures.

An edge coupler, also known as a spot-size converter, is a type of photonic device that is commonly used for coupling light of a given mode from a light source to a photonic integrated circuit. The edge coupler may include a section of a waveguide core that defines an inverse taper having a tip. The narrow end of the inverse taper at the tip is positioned adjacent to the light source. The wide end of the inverse taper is connected to another section of the waveguide core that guides and routes the light to the photonic integrated circuit.

The gradual variation in the cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width dimension increases, the inverse taper can eventually support the entire incident mode and confine the electromagnetic field.

Improved structures for an edge coupler and methods of forming such structures are needed.

SUMMARY

In an embodiment of the invention, a structure for an edge coupler is provided. The structure comprises a waveguide core including a facet, a first tapered section, a second tapered section, and a longitudinal axis. The first tapered section is positioned along the longitudinal axis between the second tapered section and the facet. The first tapered section has a first width dimension that varies non-linearly with position along the longitudinal axis. The second tapered section has a second width dimension that varies non-linearly with position along the longitudinal axis.

In an embodiment of the invention, a method of forming an edge coupler is provided. The method comprises forming a waveguide core including a facet, a first tapered section, a second tapered section, and a longitudinal axis. The first tapered section is positioned along the longitudinal axis between the second tapered section and the facet, the first tapered section has a first width dimension that varies non-linearly with position along the longitudinal axis, and the second tapered section has a second width dimension that varies non-linearly with position along the longitudinal axis.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
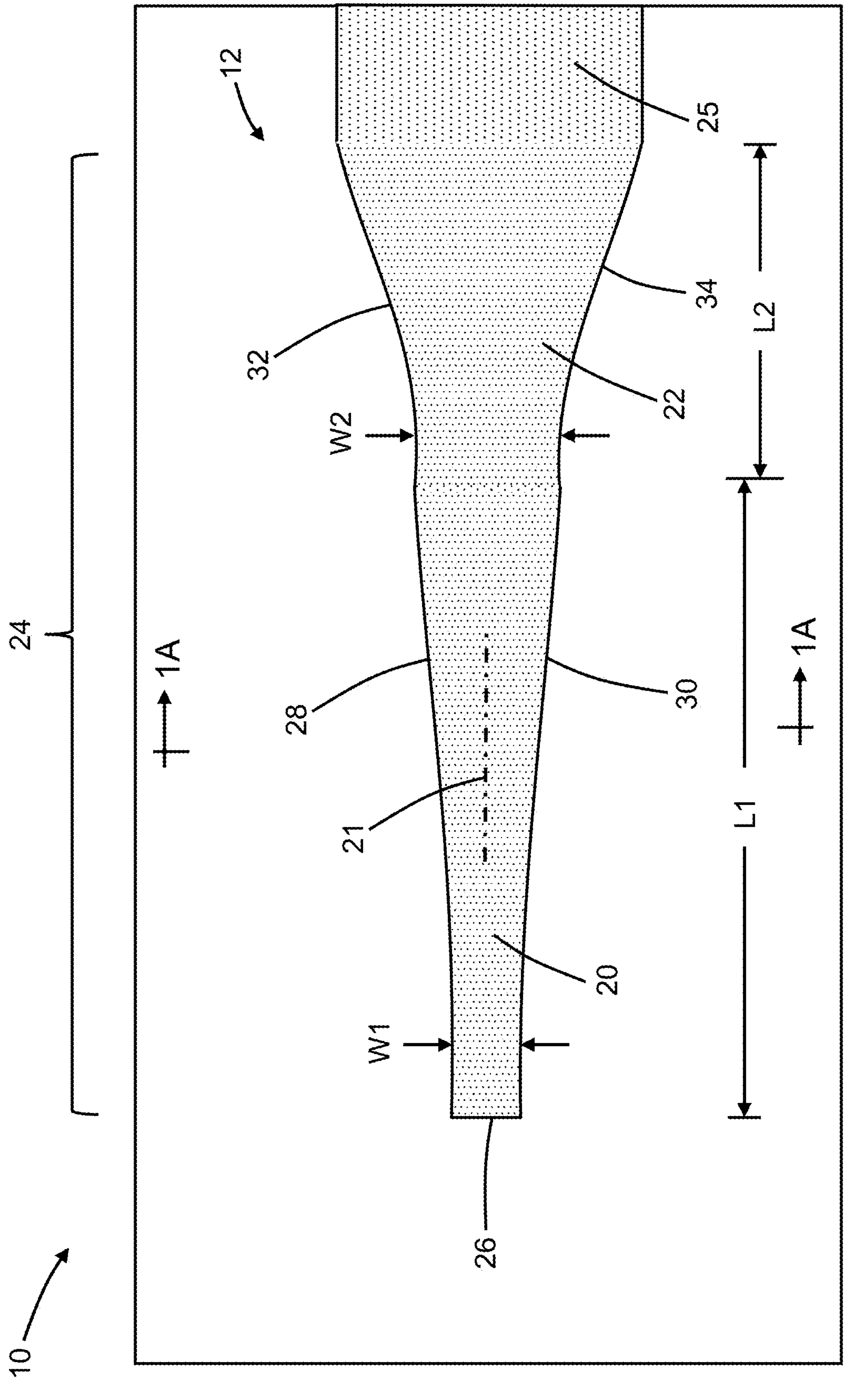
FIG. 1 is a top view of a structure at an initial fabrication stage of a processing method in accordance with embodiments of the invention.
Figure 1A:
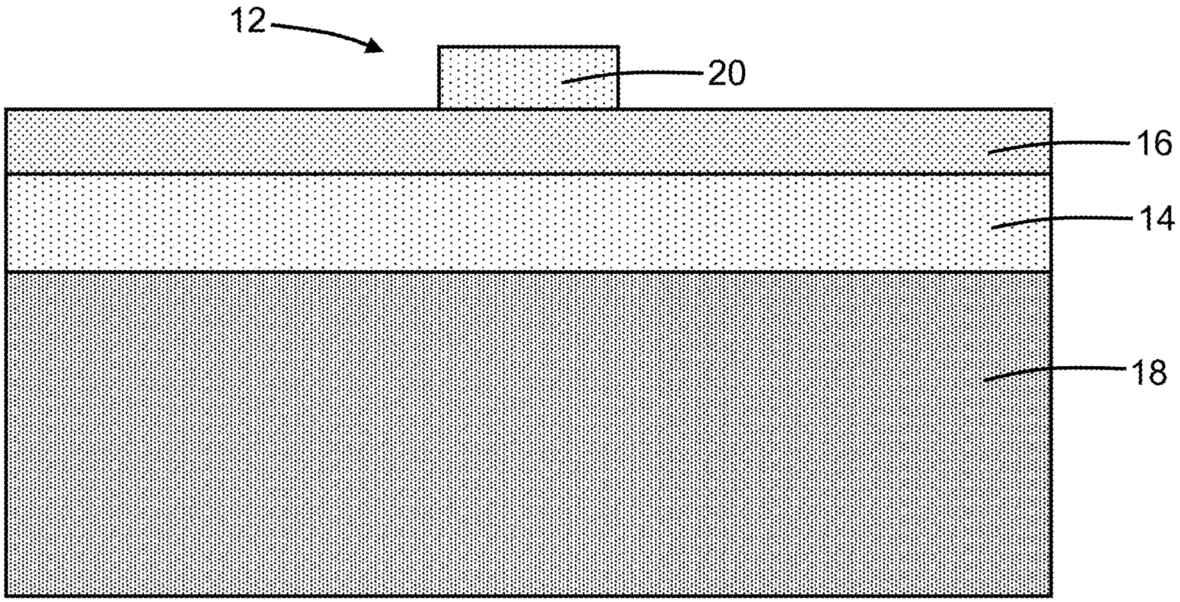
FIG. 1A is a cross-sectional view taken generally along line 1A-1A in FIG. 1.

With reference to FIGS. 1, 1A and in accordance with embodiments of the invention, a structure 10 for a photonics device includes a waveguide core 12 that is positioned on, and over, a dielectric layer 14, a dielectric layer 16, and a semiconductor substrate 18. In an embodiment, the dielectric layers 14, 16 may be comprised of a dielectric material, such as silicon dioxide, and the semiconductor substrate 18 may be comprised of a semiconductor material, such as single-crystal silicon. The waveguide core 12 is separated from the semiconductor substrate 18 by the dielectric material of the intervening dielectric layers 14, 16, which operate as lower cladding. The waveguide core 12 may be disposed directly on the dielectric layer 16. In an alternative embodiment, the dielectric layer 16 may be omitted such that the waveguide core 12 is disposed directly on the dielectric layer 14.

In an embodiment, the waveguide core 12 may be comprised of a material having a refractive index that is greater than the refractive index of silicon dioxide. In an embodiment, the waveguide core 12 may be comprised of silicon nitride. In an alternative embodiment, the waveguide core 12 may be comprised of a dielectric material, such as silicon oxynitride or aluminum nitride, different from silicon nitride. In an alternative embodiment, the waveguide core 12 may be comprised of a semiconductor material, such as single-crystal silicon, amorphous silicon, or polycrystalline silicon. In alternative embodiments, other materials, such as a III-V compound semiconductor or a polymer, may be used to form the waveguide core 12.

In an embodiment, the waveguide core 12 may be formed by patterning a layer with lithography and etching processes. In an embodiment, an etch mask may be formed by the lithography process over the layer to be patterned, and unmasked sections of the layer may be etched and removed by the etching process. The masked sections of the layer may determine the patterned shape of the waveguide core 12. In an embodiment, the waveguide core 12 may be formed by patterning a deposited layer comprised of its constituent material (e.g., silicon nitride). In an alternative embodiment, the waveguide core 12 may be formed by patterning the semiconductor material (e.g., single-crystal silicon) of the device layer of a silicon-on-insulator substrate in which the underlying dielectric layer 14 is a buried oxide layer and the dielectric layer 16 is omitted.

The waveguide core 12 may include a tapered section 20 and a tapered section 22 that are capable of functioning as an edge coupler 24. The waveguide core 12 terminates at a facet 26 and, more specifically, the tapered section 20 terminates at the facet 26. The tapered section 22 of the waveguide core 12 may be connected by a section 25 of the waveguide core 12 to a photonic integrated circuit of the photonic chip such that light can be received from a light source 44 (FIG. 3), such as an optical fiber or a laser, at the facet 26 and transferred by the edge coupler 24 to the photonic integrated circuit.

The tapered sections 20, 22 of the edge coupler 24 are aligned along a longitudinal axis 21 of the waveguide core 12. The tapered section 20 of edge coupler 24 has sidewalls 28, 30 that extend from the tapered section 22 to the facet 26. The tapered section 22 of edge coupler 24 has sidewalls 32, 34 that extend from the tapered section 20 to the section 25. The tapered section 20 and the tapered section 22 provide the edge coupler 24 with multiple stages of tapering each characterized by a different taper angle. The tapered section 20 has a length L1 between the facet 26 and the junction with the tapered section 22. The tapered section 22 has a length L2 between the junction with the tapered section 20 and the junction with the section 25. The edge coupler 24 may have a length given by the sum of the length L1 and the length L2. In an embodiment, the length L1 of the tapered section 20 may be greater than the length L2 of the tapered section 22.

The tapered section 20 of the edge coupler 24 is a non-uniform or non-linear taper that gradually tapers up in a direction from the facet 26 to the tapered section 22. In an embodiment, the tapered section 20 of the edge coupler 24 may be a concave taper that gradually tapers up in a direction from the facet 26 to the tapered section 22. The tapered section 20 has a width dimension W1 between the sidewalls 28, 30 that is characterized by a minimum width at the facet 26, a maximum width at the junction with the tapered section 22, and a taper angle between the minimum width and the maximum width. The sidewall 28 of the tapered section 20 is inwardly curved (i.e., dished or concave) to contribute to the non-linear tapering of the tapered section 20. The sidewall 30 of the tapered section 20 is also inwardly curved (i.e., dished or concave) to contribute to the non-linear tapering of the tapered section 20. In an embodiment, the inward curvature of the sidewall 30 may be equal to the inward curvature of the sidewall 28.

The width dimension W1 for the non-linear taper embodied in the tapered section 20 may be described by a non-linear function. In an embodiment, the width dimension W1 of the tapered section 20 may vary based on a non-linear function, such as a quadratic function, a cubic function, a parabolic function, a sine function, a cosine function, a Bezier function, or an exponential function. In an embodiment, the width dimension W1 for the non-linear taper of the tapered section 20 as a function of x (the position along the longitudinal axis 21 between the facet 26 and the junction with the tapered section 20) may be described by an exponential function: W1($x$)=w1*exp{log(w2/w1)*(L(x)/L1)^a, where w1 is the width dimension W1 at the facet 26, w2 is the width dimension W1 at the junction with the tapered section 22, and a is a constant (e.g., a positive integer such as 2, 3, etc.). In an embodiment, the width dimension W1 for the non-linear taper of the tapered section 20 may be described by a parabolic function: W1($x$)=(w2−w1)*(L(x)/L1)^a.

The tapered section 22 of the edge coupler 24 is a non-uniform or non-linear taper that gradually tapers up in a direction from the junction with the tapered section 20 to the junction with the section 25. In an embodiment, the tapered section 22 of the edge coupler 24 may be a concave taper that gradually tapers up in a direction from junction with the tapered section 20 to the junction with the section 25. The tapered section 22 may have a width dimension W2 between the sidewalls 32, 34 that is characterized by a minimum width at the junction with the tapered section 20, a maximum width at the junction with the section 25, and a taper angle between the minimum width and the maximum width. In an embodiment, the taper angle of the tapered section 22 may differ from the taper angle of the tapered section 20. For example, the taper angle of the tapered section 22 may be greater than the taper angle of the tapered section 20.

The sidewall 32 of the tapered section 22 is inwardly curved (i.e., dished or concave) to contribute to the non-linear tapering of the tapered section 22. The sidewall 34 of the tapered section 22 is also inwardly curved (i.e., dished or concave) to contribute to the non-linear tapering of the tapered section 22. In an embodiment, the inward curvature of the sidewall 32 may be equal to the inward curvature of the sidewall 34. The sidewall 32 of the tapered section 22 may adjoin the sidewall 28 of the tapered section 20, and the sidewall 34 of the tapered section 22 may adjoin the sidewall 30 of the tapered section 20.

The width dimension W2 for the non-linear taper embodied in the tapered section 22 may be described by a non-linear function. In an embodiment, the width dimension W2 of the tapered section 22 may vary based on a non-linear function, such as a quadratic function, a cubic function, a parabolic function, a sine function, a cosine function, a Bezier function, or an exponential function. In an embodiment, the width dimension W2 for the non-linear taper of the tapered section 22 as a function of x (the position along the longitudinal axis 21 between the junction with the tapered section 20 and the junction with the section 25) may be described by an exponential function: W2($x$)=w1*exp{log (w2/w1)*(L(x)/L2)^a, where w1 is the width dimension W2 at the junction with the tapered section 20, w2 is the width dimension W2 at the junction with the section 25, and a is a constant (e.g., a positive integer such as 2, 3, . . . ). In an embodiment, the width dimension W2 for the non-linear taper of the tapered section 22 may be described by a parabolic function: W2($x$)=(w2−w1)*(L(x)/L2)^a.

The mode evolution of light propagating through the tapered section 20 of the edge coupler 24 and through the tapered section 22 of the edge coupler 24 may be adiabatic or substantially adiabatic, in that variations in the cross-sectional profiles of the tapered sections 20, 22 are sufficiently slow and smooth to render coupling to other modes and radiative losses negligible or below an operationally acceptable level.

Figure 2:
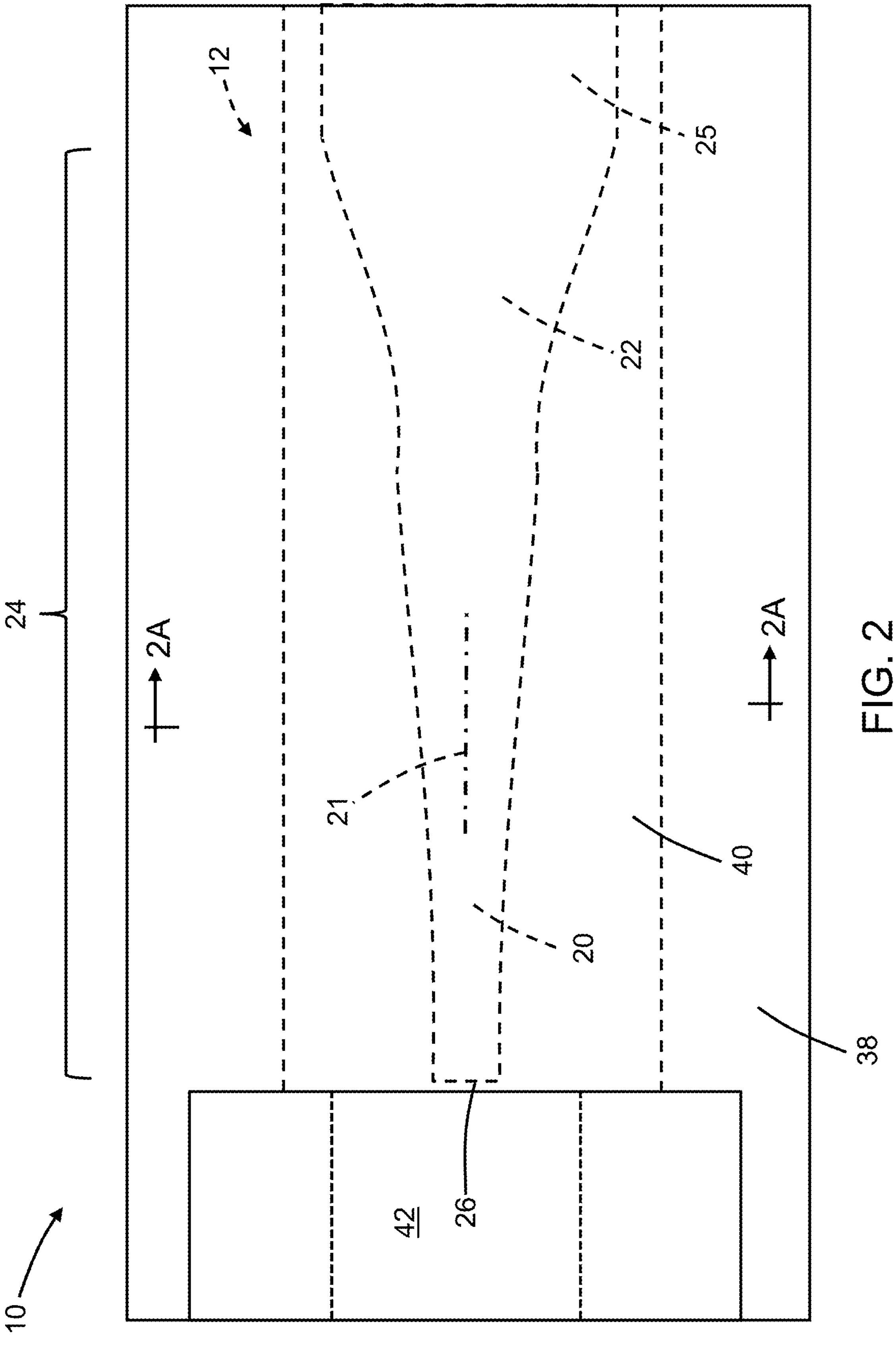
FIG. 2 is a top view of the structure at a fabrication stage of the processing method subsequent to FIGS. 1, 1A.
Figure 2A:
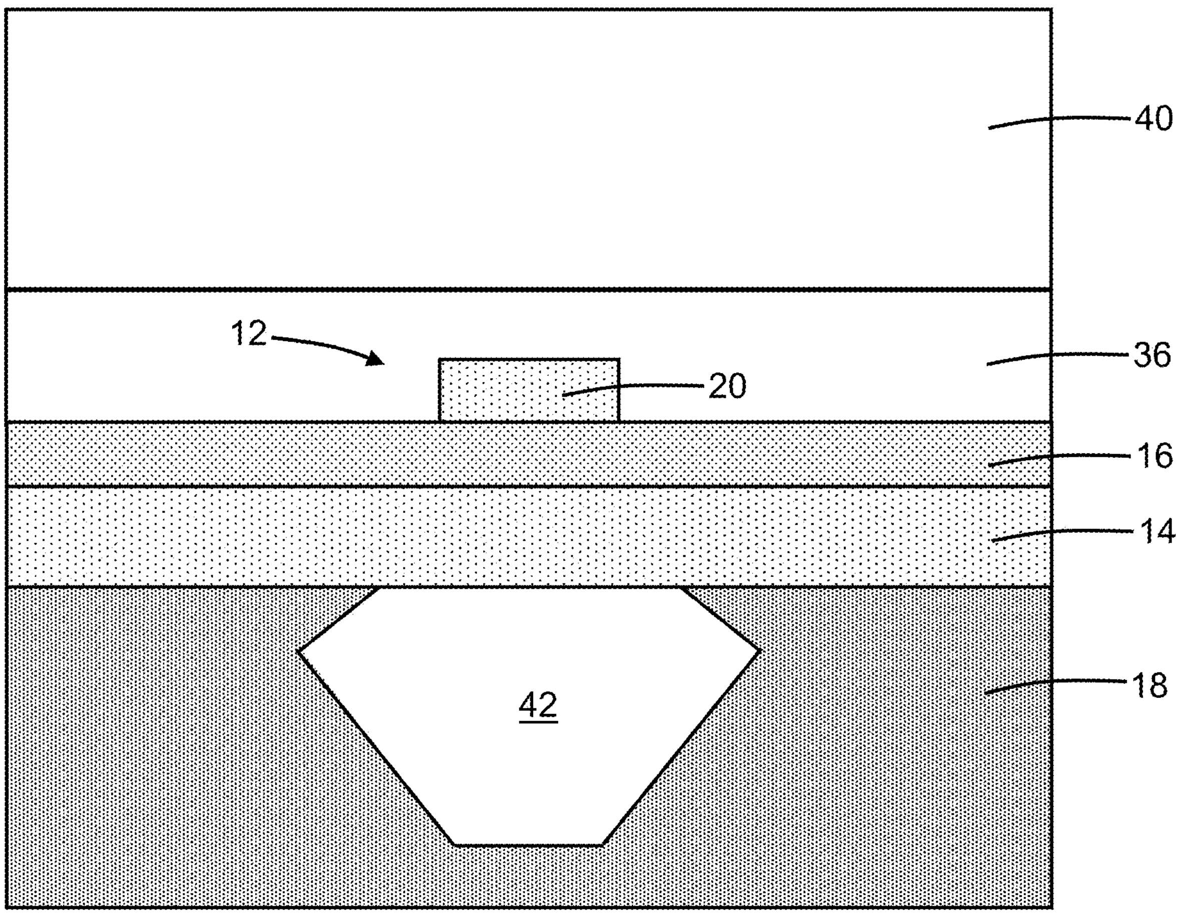
FIG. 2A is a cross-sectional view taken generally along line 2A-2A in FIG. 2.

With reference to FIGS. 2, 2A in which like reference numerals refer to like features in FIGS. 1, 1A and at a subsequent fabrication stage, a dielectric layer 36 may be formed over the waveguide core 12. The dielectric layer 36 may be comprised of a dielectric material, such as silicon dioxide, that is deposited and planarized. The edge coupler 24 may be fully embedded in the dielectric layer 36, which provides low-index cladding.

A back-end-of-line stack 38 may be formed over the structure 10. A dielectric layer 40 that may be formed that replaces a removed portion of the back-end-of-line stack 38 directly over the edge coupler 24. The back-end-of-line stack 38 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide. The dielectric layer 40 may be comprised of a homogenous dielectric material, such as silicon dioxide.

A cavity 42 may be formed by a wet etching process in the semiconductor substrate 18 adjacent to the edge coupler 24. The cavity 42 may include a portion that extends as an undercut region beneath the dielectric layer 14 such that all or a portion of the edge coupler 24 is suspended on the dielectric layer 14 over the undercut region. The undercut region of the cavity 42 may function to reduce light loss to the semiconductor substrate 18. In an embodiment, an etching process used to form the cavity 42 may exhibit a crystallographic orientation dependence in which the kinetics of the etching process may vary according to crystal plane and, in particular, may vary for different low-index crystal planes. Due to these variations in its kinetics, the etching process may form angled sidewalls at the side edges of the cavity 42. In an alternative embodiment, the cavity 42 may be formed by a dry etching process and may have curved sidewalls.

Figure 3:
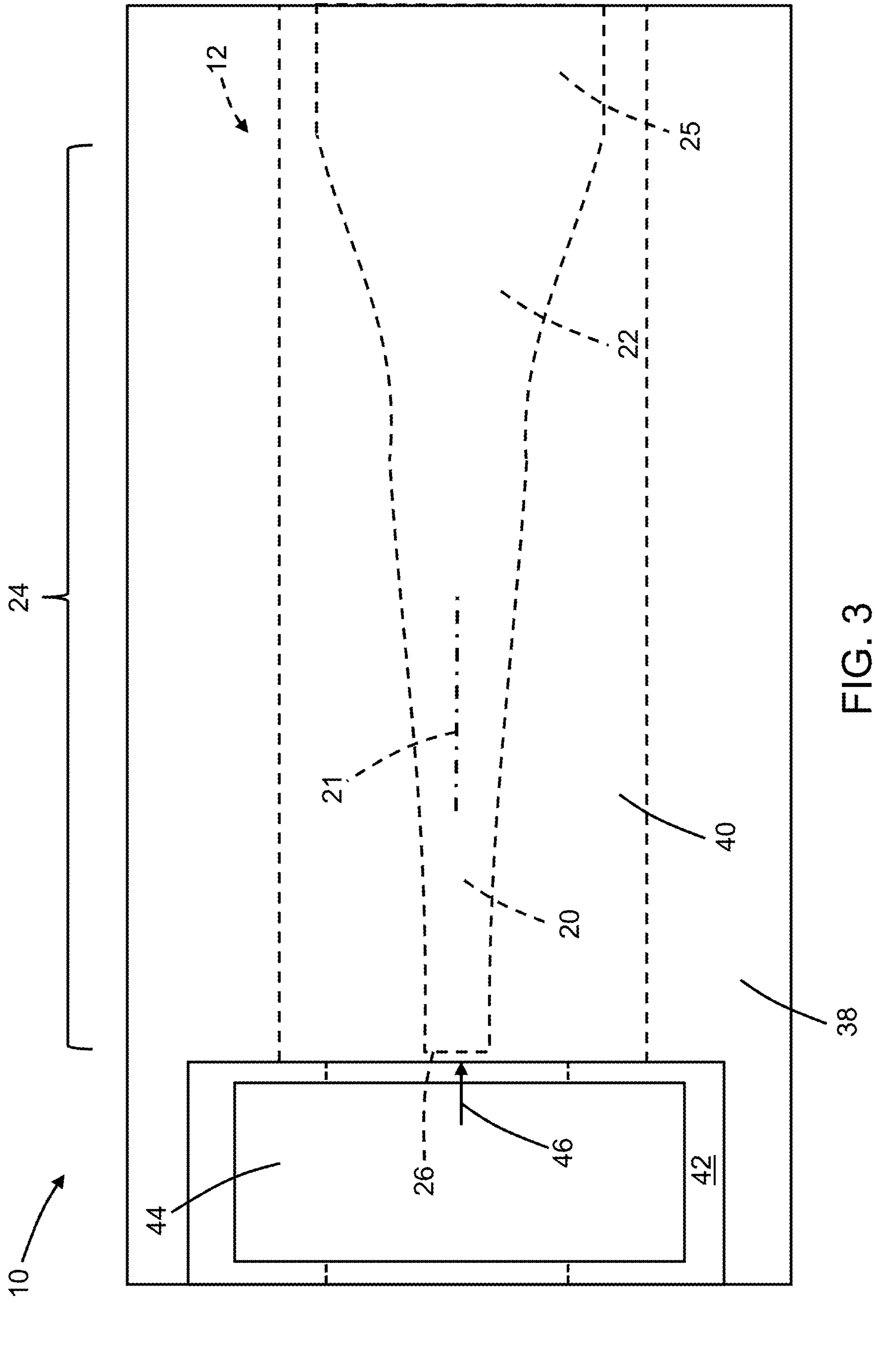
FIG. 3 is a top view of the structure at a fabrication stage of the processing method subsequent to FIGS. 2, 2A.

With reference to FIG. 3 in which like reference numerals refer to like features in FIGS. 2, 2A and at a subsequent fabrication stage, a light source 44 may be placed into the cavity 42. In an embodiment, the light source 44 may be an optical fiber that includes a tip portion inserted into the cavity 42 adjacent to the facet 26 of the edge coupler 24. The light source 44 may include a light output 46 that is aligned with the facet 26 of the edge coupler 24 and that is configured to provide light in a mode propagation direction toward the facet 26 of the edge coupler 24. In an embodiment, the light source 44 may be a single-mode optical fiber. In an alternative embodiment, the edge coupler 24 may be angled relative to the light output 46 from the light source 44 to reduce back reflection.

In an alternative embodiment, the light source 44 may be a laser chip that includes a semiconductor laser configured to output light from the light output 46 in an infrared wavelength range. In an embodiment, the laser chip may include a laser comprised of III-V compound semiconductor materials. In an embodiment, the laser chip may include an indium phosphide/indium-gallium-arsenic phosphide laser that is configured to generate continuous laser light in an infrared wavelength range. In an alternative embodiment, the light source 44 may include a photonic bump having internal turning mirrors and lensed mirrors that collimate and focus light received from an optical fiber and provide the collimated, focused light to the edge coupler 24.

The tapered section 20 with the non-linear width W1 and the tapered section 22 with the non-linear width W2, in combination, may significantly reduce the insertion loss exhibited by the edge coupler 24 and, in particular, the tapered sections 20, 22 may significantly reduce the insertion loss exhibited by the edge coupler 24 when the light source 44 is an optical fiber. The tapered section 20 with the non-linear width W1 and the tapered section 22 with the non-linear width W2, in combination, may provide the edge coupler 24 with a significantly flatter through band response and, in particular, the tapered sections 20, 22 may provide the edge coupler 24 with a significantly flatter through band response when the light source 44 is an optical fiber. The edge coupler 24 may be characterized by improved performance relative to a conventional edge coupler with either single-stage tapering or multiple-stage tapering having either planar or convex (i.e., outwardly curved) sidewalls. The tapered sections 20, 22 of the edge coupler 24 may mitigate mode hybridization for large mode sizes.

Figure 4:
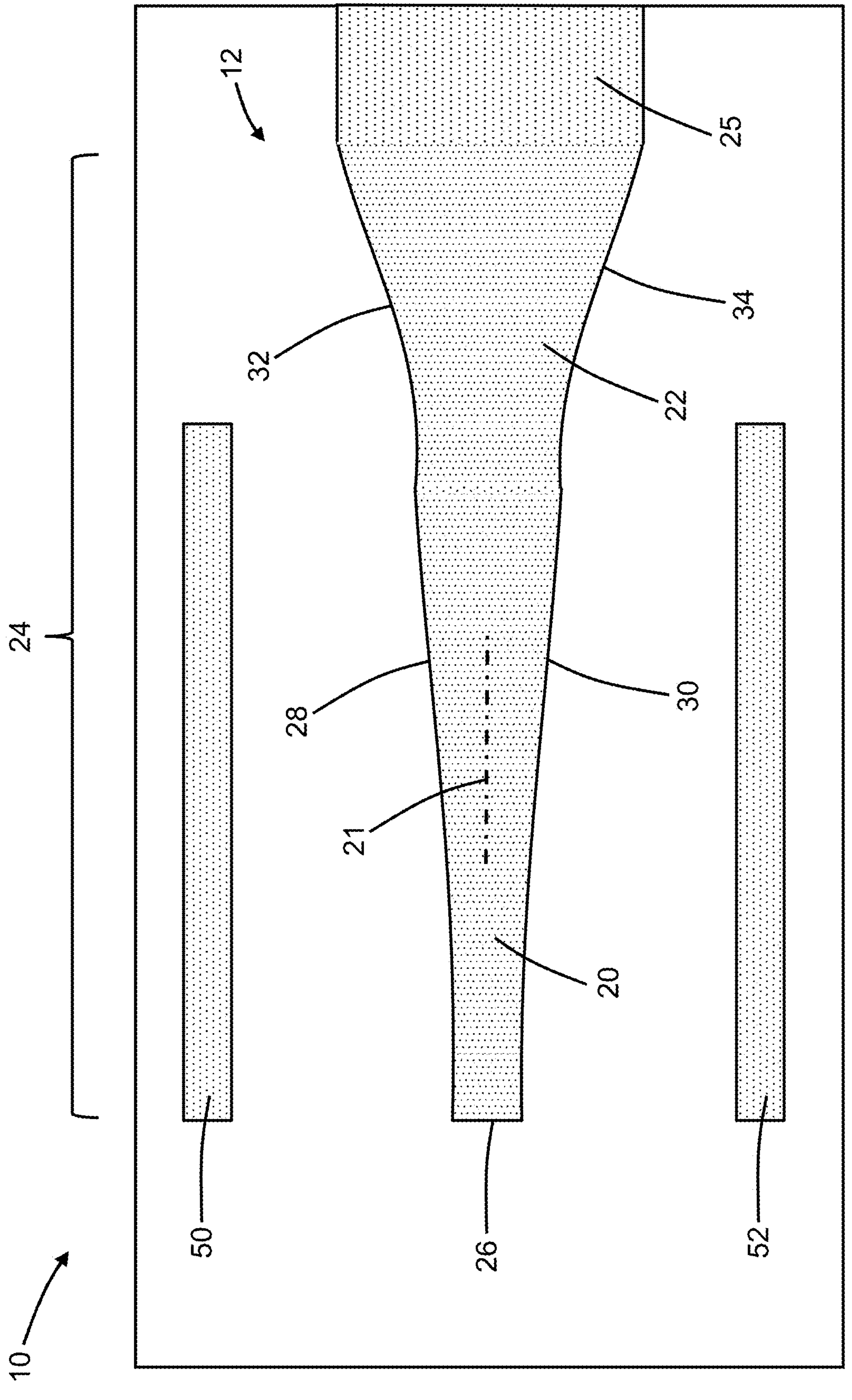
FIG. 4 is a top view of a structure in accordance with alternative embodiments.

With reference to FIG. 4 and in accordance with alternative embodiments, the edge coupler 24 may be a multiple-tip structure that includes a coupling-assistance feature 50 and a coupling-assistance feature 52 that are positioned laterally adjacent to the tapered sections 20, 22. The coupling-assistance features 50, 52 may be formed when the waveguide core 12 is patterned and may be comprised of the same material as the waveguide core 12. In an embodiment, the coupling-assistance features 50, 52 may be elongated strips having a length between terminating opposite ends.

In an alternative embodiment, the edge coupler 24 and coupling-assistance features 50, 52 may be angled relative to the light output 46 from the light source 44 to reduce back reflection. In an alternative embodiment, additional pairs of the coupling-assistance features 50, 52 may be added to the multiple-tip structure.

Figure 5:
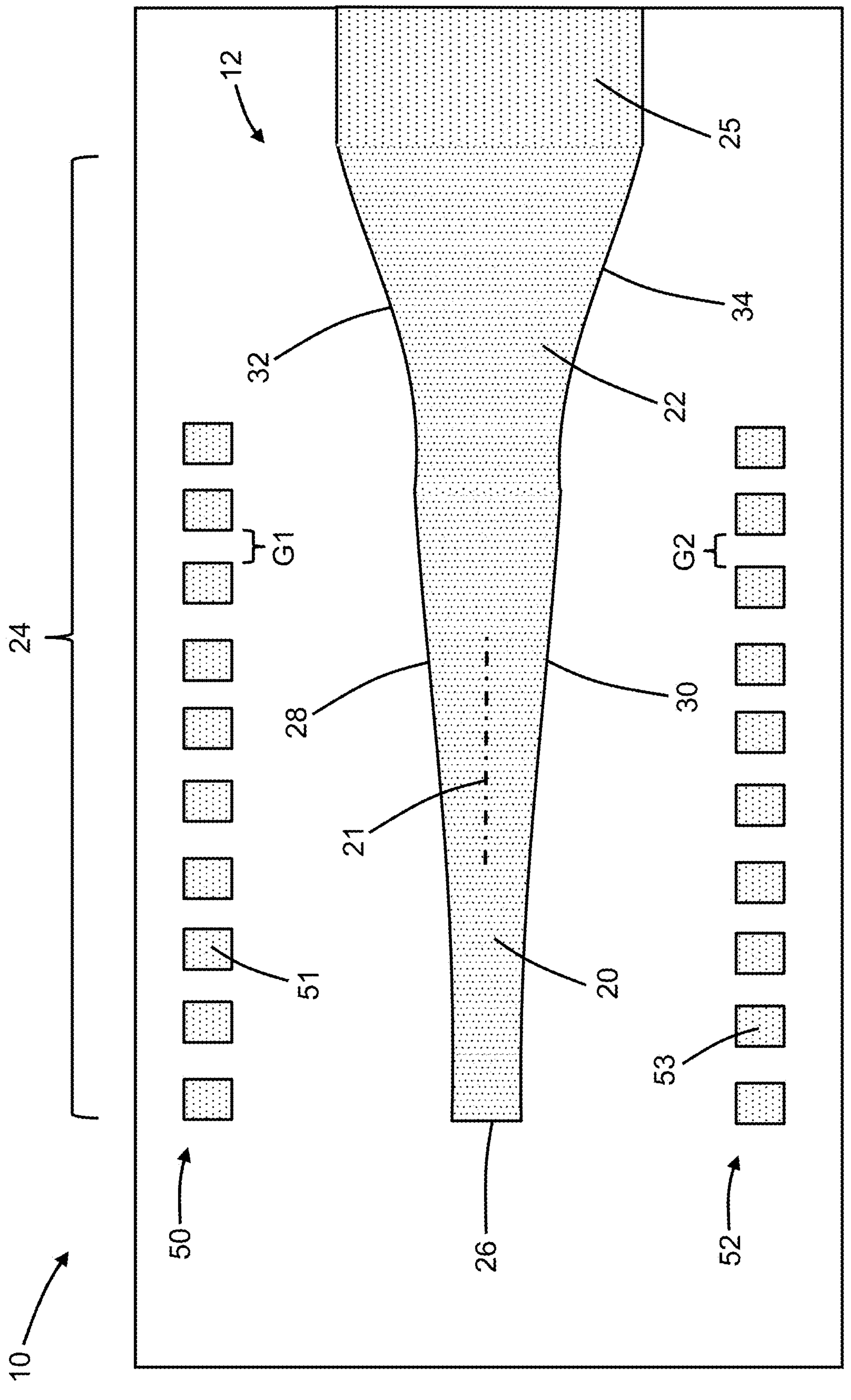
FIG. 5 is a top view of a structure in accordance with alternative embodiments.

With reference to FIG. 5 and in accordance with alternative embodiments, the coupling-assistance feature 50 of the edge coupler 24 may include multiple segments 51 and the coupling-assistance feature 52 of the edge coupler 24 may include multiple segments 53. Adjacent pairs of the segments 51 may be separated by gaps G1 and adjacent pairs of the segments 53 may be separated by gaps G2. In an embodiment, the pitch and duty cycle of the segments 51, 53 may be uniform to define a periodic arrangement. In alternative embodiments, the pitch and/or the duty cycle of the segments 51, 53 may be apodized (i.e., non-uniform) to define an aperiodic arrangement. The segments 51, 53 may be dimensioned and positioned at small enough pitch so as to define a sub-wavelength grating that does not radiate or reflect light at a wavelength of operation. For example, the periodicity of the segments 51, 53 may be less than one-half the wavelength of the light guided by the edge coupler 24.

The dielectric material of the subsequently-formed dielectric layer 36 is positioned in the gaps G1 between adjacent pairs of the segments 51 of the coupling-assistance feature 50 and in the gaps G2 between the adjacent pairs of the segments 53 of the coupling-assistance feature 52 such that metamaterial structures may be defined in which the material constituting the segments 51, 53 has a higher refractive index than the dielectric material of the dielectric layer 36. Each metamaterial structure can be treated as a homogeneous material having an effective refractive index that is intermediate between the refractive index of the material constituting the segments 51, 53 and the refractive index of the dielectric material constituting the dielectric layer 36.

Figure 6:
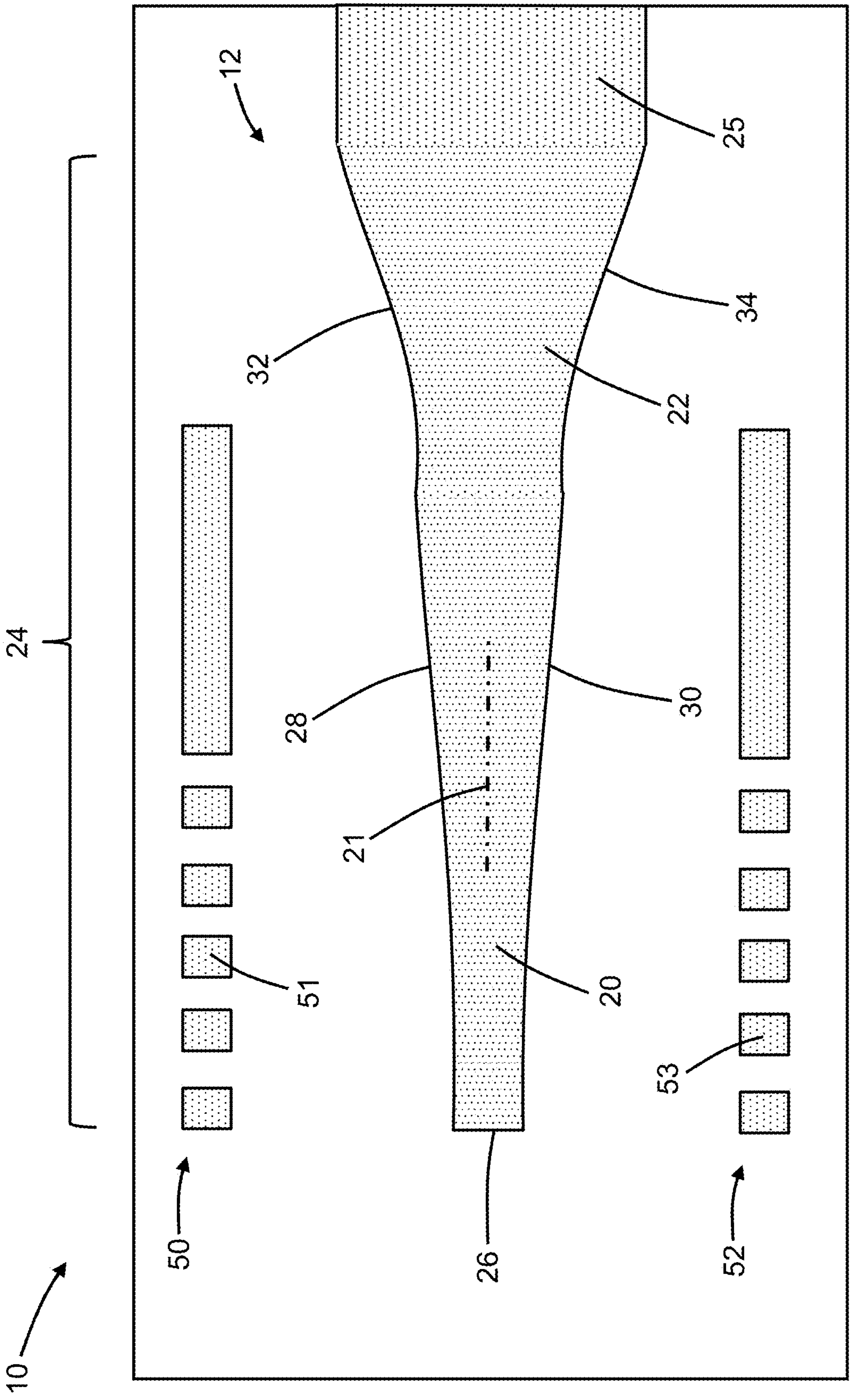
FIG. 6 is a top view of a structure in accordance with alternative embodiments.

With reference to FIG. 6 and in accordance with alternative embodiments, a portion of the coupling-assistance feature 50 of the edge coupler 24 may include the segments 51 and another portion of the coupling-assistance feature 50 may be solid and unbroken. Similarly, a portion of the coupling-assistance feature 52 of the edge coupler 24 may include the segments 53 and another portion of the coupling-assistance feature 52 may be solid and unbroken.

Figure 7:
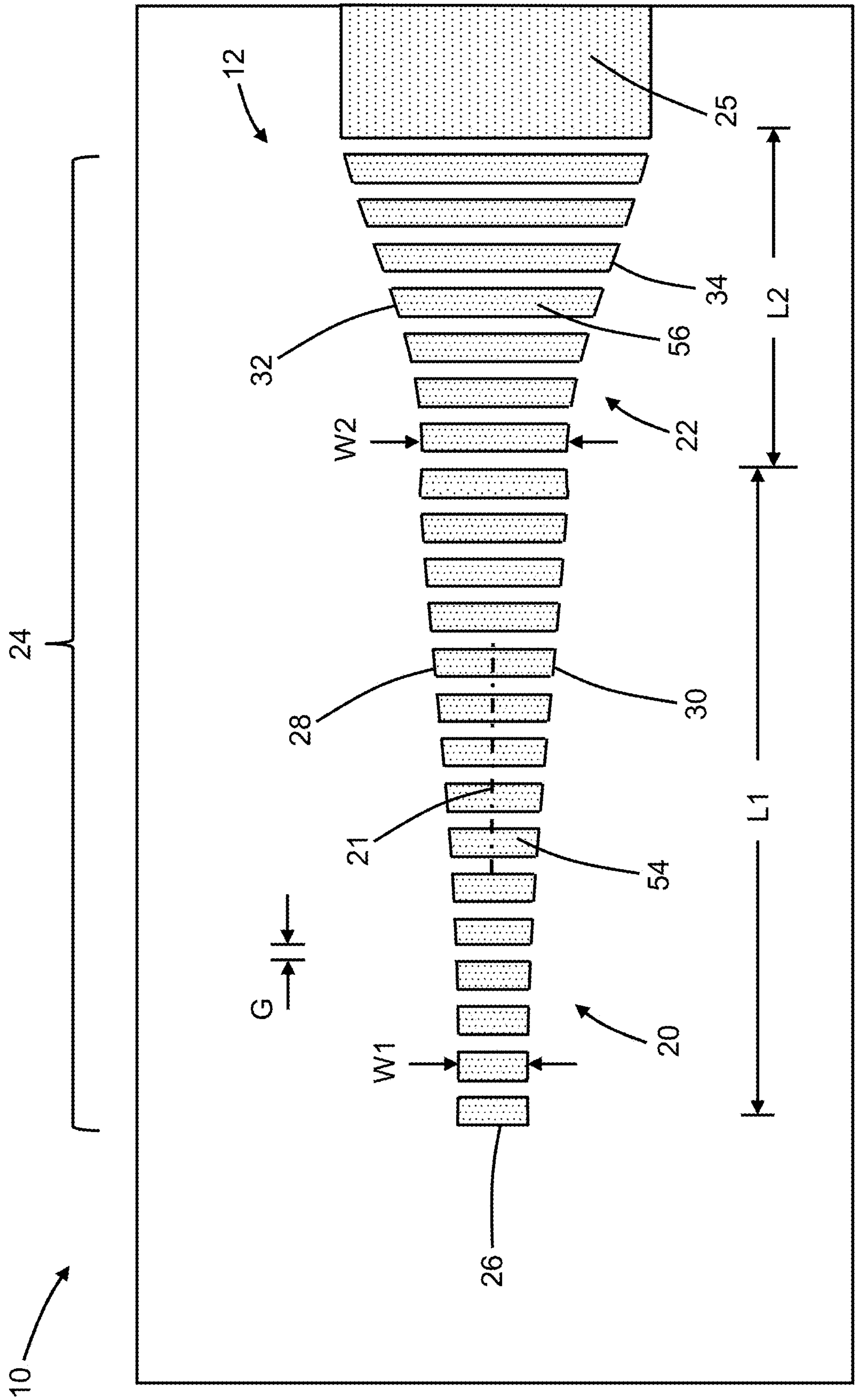
FIG. 7 is a top view of a structure in accordance with alternative embodiments.

With reference to FIG. 7 and in accordance with alternative embodiments, the tapered section 20 of the edge coupler 24 may include multiple segments 54 and the tapered section 22 of the edge coupler 24 may include multiple segments 56. The segments 54, 56, which may be patterned when the waveguide core 12 is patterned, may be aligned along the longitudinal axis 21 of the edge coupler 24. Adjacent pairs of the segments 54 and adjacent pairs of the segments 56 may be separated by gaps G. In an embodiment, the pitch and duty cycle of the segments 54, 56 may be uniform to define a periodic arrangement. In alternative embodiments, the pitch and/or the duty cycle of the segments 54, 56 may be apodized (i.e., non-uniform) to define an aperiodic arrangement. The segments 54, 56 may be dimensioned and positioned at small enough pitch so as to define a sub-wavelength grating that does not radiate or reflect light at a wavelength of operation. For example, the periodicity of the segments 54, 56 may be less than one-half the wavelength of the light guided by the edge coupler 24. The sidewalls 28, 30 of the tapered section 20 define an envelope for the non-linear tapering of the width dimension W1 of the segments 54. The sidewalls 32, 34 of the tapered section 22 define an envelope for the non-linear tapering of the width dimension W1 of the segments 56.

The dielectric material of the subsequently-formed dielectric layer 36 is positioned in the gaps G between adjacent pairs of the segments 54, 56 of the edge coupler 24 such that a metamaterial structure may be defined in which the material constituting the segments 54, 56 has a higher refractive index than the dielectric material of the dielectric layer 36. The metamaterial structure can be treated as a homogeneous material having an effective refractive index that is intermediate between the refractive index of the material constituting the segments 54, 56 and the refractive index of the dielectric material constituting the dielectric layer 36.

In an alternative embodiment, a rib may be overlaid on some or all of the segments 56 to provide a central connection between the overlaid segments 56. In an alternative embodiment, the coupling-assistance features 50, 52 may be formed adjacent to the segments 54 of the tapered section 20 and the segments 56 of the tapered section 22.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value or precise condition as specified. In embodiments, language of approximation may indicate a range of +/−10% of the stated value(s) or the stated condition(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal plane, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:

a waveguide core including a facet, a first tapered section, a second tapered section, and a longitudinal axis, the first tapered section positioned along the longitudinal axis between the second tapered section and the facet, the first tapered section terminating at the facet, the first tapered section adjoining the second tapered section at a junction, the first tapered section having a first width dimension that varies non-linearly with position along the longitudinal axis, the first width dimension of the first tapered section having a first minimum width at the facet and a first maximum width at a junction with the second tapered section, and the second tapered section having a second width dimension that varies non-linearly with position along the longitudinal axis.

2. The structure of claim 1 wherein the first tapered section has a first concave sidewall and a second concave sidewall opposite from the first concave sidewall.

3. The structure of claim 2 wherein the second tapered section has a third concave sidewall and a fourth concave sidewall opposite from the third concave sidewall.

4. The structure of claim 3 wherein the first concave sidewall adjoins the third concave sidewall, and the second concave sidewall adjoins the fourth concave sidewall.

5. The structure of claim 1 wherein the waveguide core comprises silicon nitride.

6. The structure of claim 1 wherein the first width dimension of the first tapered section varies non-linearly with position along the longitudinal axis according to a first exponential function.

7. The structure of claim 6 wherein the second width dimension of the second tapered section varies non-linearly with position along the longitudinal axis according to a second exponential function.

8. The structure of claim 1 wherein the first width dimension of the first tapered section varies non-linearly with position along the longitudinal axis according to a hyperbolic function.

9. The structure of claim 8 wherein the second width dimension of the second tapered section varies non-linearly with position along the longitudinal axis according to a second hyperbolic function.

10. The structure of claim 1 wherein the first width dimension of the first tapered section varies non-linearly with position along the longitudinal axis according to a first non-linear function.

11. The structure of claim 10 wherein the second width dimension of the second tapered section varies non-linearly with position along the longitudinal axis according to a second non-linear function.

12. The structure of claim 1 wherein the waveguide core includes a non-tapered section, the second tapered section is positioned along the longitudinal axis between the first tapered section and the non-tapered section, and the second width dimension of the second tapered section has a second minimum width at the junction with the second first tapered section and a second maximum width at a junction with the non-tapered section.

13. The structure of claim 12 wherein the first tapered section has a first taper angle between the first minimum width and the first maximum width, the second tapered section has a second taper angle between the second minimum width and the second maximum width, and the second taper angle is greater than the first taper angle.

14. The structure of claim 1 further comprising:

a light source adjacent to the facet, the light source having a light output configured to provide light in a mode propagation direction toward the facet.

15. The structure of claim 1 wherein the first tapered section includes a first plurality of segments and a first plurality of gaps between adjacent pairs of the first plurality of segments, and the second tapered section includes a second plurality of segments and a second plurality of gaps between adjacent pairs of the second plurality of segments.

16. The structure of claim 15 wherein the first plurality of gaps and the second plurality of gaps are filled by portions of a dielectric material to define a metamaterial.

17. The structure of claim 1 further comprising:

a first coupling-assistance feature; and a second coupling-assistance feature, wherein the first tapered section and the second tapered section are disposed laterally between the first coupling-assistance feature and the second coupling-assistance feature.

18. The structure of claim 1 wherein the second width dimension of the second tapered section has a second minimum width at the junction with the first tapered section, a second maximum width, and a taper angle between the second minimum width and the second maximum width.

19. A method of forming a structure for an edge coupler, the method comprising:

forming a waveguide core including a facet, a first tapered section, a second tapered section, and a longitudinal axis, wherein the first tapered section is positioned along the longitudinal axis between the second tapered section and the facet, the first tapered section terminates at the facet, the first tapered section adjoins the second tapered section at a junction, the first tapered section has a first width dimension that varies non-linearly with position along the longitudinal axis, the first width dimension of the first tapered section has a first minimum width at the facet and a first maximum width at a junction with the second tapered section, and the second tapered section has a second width dimension that varies non-linearly with position along the longitudinal axis.

20. The structure of claim 18 wherein the first width dimension of the first tapered section varies non-linearly with position along the longitudinal axis according to a first non-linear function, and the second width dimension of the second tapered section varies non-linearly with position along the longitudinal axis according to a second non-linear function.

* * * * *